United States Patent Office 3,389,176
Patented June 18, 1968

3,389,176
2-AMINOPHENYL-CYCLOALKYL-KETOXIMES
Leo Berger, Montclair, and Leo Henryk Sternbach, Upper Montclair, N.J., assignors to Hoffmann-La Roche Inc., Nutley, N.J., a corporation of New Jersey
No Drawing. Original application Sept. 11, 1961, Ser. No. 137,047, now Patent No. 3,338,886, dated Aug. 29, 1967. Divided and this application Apr. 5, 1967, Ser. No. 628,528
2 Claims. (Cl. 260—566)

ABSTRACT OF THE DISCLOSURE

This invention relates to novel 2-amino-phenylcycloalkyl ketoximes and 2-chloromethyl-4-cycloalkyl quinazoline-3-oxide which are chemical intermediates in the preparation of novel benzodiazepine compounds selected from the grouping consisting of 5-cycloalkyl-3H-1,4-benzodiazepin-2(1H)-ones, pharmaceutically acceptable acid-addition salts thereof, 2-lower alkylamino-5-cycloalkyl-3H-1,4-benzodiazepines 4-oxides and pharmaceutically acceptable acid-addition salts thereof. Preferred are those benzodiazepine compounds of the above group wherein the 7-position is either unsubstituted or substituted by a halogen or nitro group. The novel benzodiazepine compounds are useful as tranquilizers, and anticonvulsant agents.

CROSS REFERENCES TO RELATED APPLICATIONS

This application is a divisional application of Ser. No. 137,047, filed Sept. 11, 1961 now U.S. Patent No. 3,338,-886, which is a continuation-in-part of application Ser. No. 131,750, filed Aug. 16, 1961, now U.S. Patent No. 3,268,586, issued Aug. 23, 1966, and application Ser. No. 51,262, filed Aug. 23, 1960, now abandoned.

This application is also related to application Ser. No. 324,850, filed Nov. 19, 1963, and application Ser. No. 324,879, filed Nov. 19, 1963 now U.S. Patent No. 3,179,-656, which are both divisional applications of the above application Ser. No. 131, 750, filed Aug. 16, 1961.

DETAILED DESCRIPTION OF THE INVENTION

The novel benzodiazepine compounds of the invention are useful as pharmaceuticals, more particularly as tranquilizers, by virtue of their depressant action upon the central nervous system. They also are useful as anticonvulsant agents. The pharmacological activity of the compounds is demonstrated in the inclined screen test, the foot shock test, the anti-maximal electroshock test, and the anti-pentamethylenetetrazol test. The compounds can be administered internally for example orally or parenterally and can be compounded into different conventional pharmaceutical forms such as tablets, capsules, lozenges, suspensions, suppositories, solutions and the like. Dosage can be adjusted to individual requirements.

More particularly the novel benzodiazepine compounds of the invention are selected from the group consisting of compounds of the formula (I)
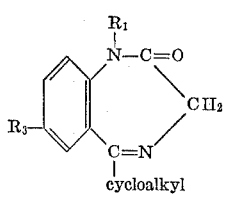

acid-addition salts thereof, and compounds of the formula (II)
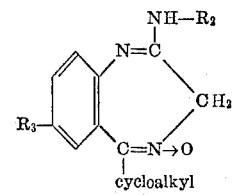

and acid-addition salts thereof; wherein $R_1$ and $R_2$ are selected from the groups consisting of hydrogen and lower alkyl and $R_3$ is selected from the group consisting of hydrogen, halogen and nitro.

As used in this disclosure the term "lower alkyl" refers to both straight and branched chain carbon-hydrogen radicals such as methyl, ethyl, n-propyl, isopropyl, n-butyl, isobutyl and the like. The term halogen includes all four halogens viz. iodine, bromine, chlorine and fluorine. The term "cycloalkyl" includes cycloaliphatic radicals, for example cyclo-lower alkyl groups such as cyclopentyl, cyclohexyl, cycloheptyl and the like. Especially preferred are those compounds wherein the cycloalkyl group is cyclohexyl.

The novel benzodiazepines of Formulas I and II above can be prepared by a variety of routes. Used as starting materials are 2-aminophenyl cycloalkyl ketones of the formula (III)
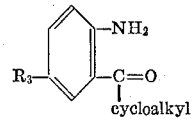

wherein $R_3$ is selected from the group consisting of hydrogen, halogen and nitro. The ketones of Formula III above are themselves novel compounds and form a part of the present invention.

In one embodiment of the invention a ketone of Formula III above is reacted with glycine or a lower alkyl ester thereof to form a compound corresponding to Formula I above. It is preferable to use a hydrohalide of glycine lower alkyl ester (e.g. glycine methyl ester hydrobrominde, glycine ethyl ester hydrochloride or the like). The reaction is advantageously conducted by heating the reactants together in a tertiary organic base.

Another method for preparing compounds of Formula I above comprises haloacetylating a ketone of Formula III above to yield a haloacetylated ketone of the formula (IV)
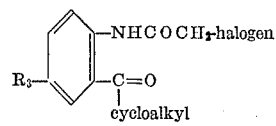

wherein $R_3$ is selected from the group consisting of hydrogen, halogen and nitro. The haloacetylated ketone of Formula IV is then, with or without isolation, reacted with ammonia to form a corresponding compound of Formula I above. As the haloacetylating agent, bromacetyl bromide is preferred, although other halides, such as chloro acetyl chloride, can be used.

Compounds of Formula II above can be prepared by reacting a ketone of Formula III above with hydroxylamine to form a corresponding ketoxime of the formula (V)
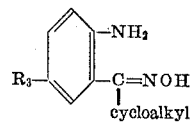

wherein $R_3$ is selected from the groups consisting of hydrogen, halogen and nitro haloacetylating said ketoxime, dehydrating the resultant haloacetylated ketoxime to a quinazoline of the formula (VI)

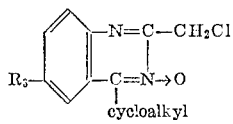

wherein $R_3$ is selected from the group consisting of hydrogen, halogen and nitro and reacting said quinazoline of Formula VI above with ammonia or a lower alkyl primary amine to obtain the corresponding compound of Formula II above.

The compounds of Formulas I and II above form pharmaceutically acceptable acid-addition salts with both inorganic and organic acids such as hydrochloric acid, hydrobromic acid, nitric acid, sulfuric acid, phosphoric acid, acetic acid, formic acid, succinic acid, p-toluenesulfonic acid and the like.

The following examples are illustrative but not limitative of the invention. All temperatures are in degrees centigrade.

Example 1

Cyclohexyl magnesium bromide was prepared under Grignard conditions from 2.7 g. of magnesium turnings and 20.2 g. of cyclohexyl bromide in 50 cc. of anhydrous ether in the usual manner. After refluxing the Grignard solution for 3 hours to complete the formation of cyclohexyl magnesium bromide, it was added slowly under anhydrous conditions to a solution of 17.3 g. of 2-methyl-6-chloro-4H-3,1-benzoxazin-4-one in 200 cc. of dry benzene containing 50 cc. of dry ether under cooling (0°–5° C.) with constant stirring.

Upon completion of the addition, the stirring was continued while the temperature rose to room temperature. After several hours at room temperature, the Grignard complex was decomposed with 30 cc. of 6 N HCl mixed with ice.

The acidified solution was then concentrated to dryness and the residue mixed with a solution of 26 cc. concentrated HCl in 160 cc. ethyl alcohol. The solution was refluxed for 2 hours, concentrated to dryness, the residue dispersed in water, and made alkaline with solid potassium carbonate. The insoluble oil was extracted with benzene and the benzene solution separated, dried over anhydrous sodium sulfate, filtered and concentrated to dryness. The amorphous residue was boiled out with pentane to exhaustion and the pentane solution was concentrated to dryness and the crystalline residue was recrystallized from pentane. There was obtained 2.8 g. of bright yellow needles melting at 115°–116°; 2-amino-5-chlorophenyl cyclohexyl ketone.

Calcd. for $C_{13}H_{16}NOCl$ (M.W. 237.5): C, 65.70; H, 6.74. Found: C, 65.63; H, 6.71.

Example 2

10.0 g. of 2-amino-5-chlorophenyl cyclohexyl ketone and 20.0 g. of glycine ethyl ester hydrochloride were added to 35 cc. of dry pyridine and refluxed for 6 hours. Upon completion of the reaction, the solvent was removed in vacuo and the residue suspended in water and extracted to completion with benzene. The benzene solution was dried over anhydrous sodium sulfate, filtered, and concentrated to dryness. The residue was dissolved in dry ether and dry hyrogen chloride gas injected. An insoluble hydrochloride separated that was collected and recrystallized from a mixture of ethyl acetate and methanol to yield 1.4 g. of product melting with decomposition at 250° C. (From the ethereal HCl solution there was recovered over 2.0 g. of unreacted ketone as the hydrochloride.) The salt obtained was 7-chloro-5-cyclohexyl - 3H - 1,4 - benzodiazepin - 2(1H) - one hydrochloride.

Calcd. for $C_{15}H_{17}N_2OCl \cdot HCl$ (M.W. 313.0): C, 57.50; H, 5.75; N, 8.95. Found: C, 57.28; H, 5.80; N, 8.82.

Example 3

A solution of cyclohexyl magnesium bromide, prepared from 3.0 g. of magnesium and 22.4 g. of cyclohexylbromide by the method described in Org. Syn. Coll., vol. I, 186, 1941, in 60 ml. of ether was added slowly to a stirring solution of 16.1 g. of 2-methyl-4H-3,1-benzoxazin-4-one in 300 ml. of ether. The addition took approximately 1 hour. During the addition, the temperature was maintained by means of an ice bath between 0° to 2°. After the addition was complete, the stirred reaction mixture was allowed to come to room temperature (22°). The reaction mixture was again cooled by means of an ice bath and 20 ml. of ethanol added with stirring, followed by 100 ml. of water and finally the reaction mixture was made acid with dilute hydrochloric acid. The ether was removed on a steam bath and 200 ml. of ethanol and 30 ml. of concentrated hydrochloric acid were then added. After the reaction mixture had remained on a steam bath for 4 hours, it was cooled by adding ice, and the pH was adjusted to 5 with solid potassium carbonate. The product that separated was extracted with chloroform and the extract dried over sodium sulfate. After the desiccant had been filtered off, the filtrate was concentrated on a water bath. The residue was distilled at reduced pressure; B.P. 125–130° at 0.12 mm. The distillate was crystallized from petroleum solvent and yielded yellow needles of 2-aminophenyl cyclohexyl ketone melting at 74–75° (uncorr.).

Example 4

To a stirred solution of 1 g. of 2-aminophenyl cyclohexyl ketone in 300 ml. of ether 0.2 ml. of bromoacetylbromide was carefully added. After 5 minutes the turbid solution was washed with 100 ml. of water. The above procedure was repeated 4 times using 0.1 ml. of bromoacetylbromide. After the last addition of acid halide, the reaction mixture was washed several times with water until neutral. The ether solution was dried over sodium sulfate. Following the removal of the desiccant by filtration the ether solution was concentrated on a water bath. The intermediate 2-bromoacetamidophenyl cyclohexyl ketone was not isolated but the residue was dissolved in 200 ml. of methanol and 200 ml. of 20 percent ammonia in methanol then added. The solution was thoroughly mixed and allowed to remain 48 hours at room temperature. The residue obtained after the volatile portion of the reaction mixture had been removed under reduced pressure on a water bath, was extracted with boiling C.P. ether. Dry hydrogen chloride was bubbled into the ether solution. The precipitate that formed was collected on a Buchner funnel, dissolved in water and then saturated with potassium carbonate. The solid base was isolated by filtration and air dried for several hours yielding 5 - cyclohexyl-3H-1,4-benzodiazepin-2(1H)-one melting at 199–201° (uncorr.).

Analysis.—Calcd. for $C_{15}H_{18}N_2O$: C, 74.5; H, 7.21. Found: C, 74.98; H, 7.45.

Example 5

1 g. of 5-cyclohexyl-3H-1,4-benzodiazepin-2-(1H)-one was slowly added, with stirring to 10 ml. of concentrated sulfuric acid. The temperature during the addition was below 3°. 0.45 g. of potassium nitrate in 5 ml. of concentrated sulfuric acid was added dropwise, with stirring, over the course of 2 hours. The temperature during the addition was maintained below 4° with an ice salt bath. After the last addiiton, the reaction mixture was stirred and the temperature allowed to rise slowly to room temperature and the stirring continued for an additional hour. The reaction mixture was then cooled with ice and the sulfuric acid neutralized with concentrated ammonium hydroxide. Ice was dropped into the mixture in order to maintain the temperature of the reaction below 10°. The precipitate that formed was filtered and air dried and then recrystallized from acetone yielding 7- nitro - 5 - cyclohexyl - 3H-1,4-benzodiazepin-2-(1H)-one melting at 232–233° (uncorr.).

Analysis.—Calcd. for $C_{15}H_{17}N_3O_3$: C, 62.70; H, 5.96; N, 14.43. Found: C, 62.75; H, 5.96; N, 14.40.

Example 6

1 g. of 7-nitro-5-cyclohexyl-3H-1,4-benzodiazepin-2-(1H)-one was dissolved in a solution of 10 ml. of ethanol and 10 ml. of 3 N hydrochloric acid. 3 ml. of concentrated hydrochloric acid was added. The solution was refluxed for 7 hours. 20 ml. of water was then added to the warm reaction mixture. After the mixture had cooled to room temperature, it was allowed to remain overnight in the ice box. The mixture was filtered and the precipitate was dried yielding 2 - amino - 5 - nitrophenyl - cyclohexyl ketone melting at 124–125° (uncorr.).

Analysis.—Calcd. for $C_{13}H_{16}N_2O_3$: C, 62.9; H, 6.45; N, 11.30. Found: C, 62.75; H, 6.07; N, 10.81.

Example 7

Cyclopentylmagnesium bromide was prepared from 2.7 g. of magnesium turnings and 20.2 g. of cyclopentyl bromide in 50 cc. of anhydrous ether under Grignard conditions. After refluxing the Grignard solution for 3 hours to complete the formation of cylopentylmagnesium bromide, it was added slowly under anhydrous condition to a solution of 17.3 g. of 2-methyl-6-chloro-4H-3,1-benzoxazin-4-one in 250 cc. of dry benzene at room temperature under constant stirring. The internal temperature rose to 42°. Upon completion of the addition, the reaction mixture was refluxed for 1½ hours, cooled to room temperature and decomposed with 30 cc. of 6 N hydorchloric acid mixed with ice shavings. The acidified mixture was filtered through a sintered glass funnel and the solution concentrated to dryness. The residue was dissolved in 160 cc. of ethanol and 26 cc. of concentrated hydrochloric acid added. The solution was then refluxed for 2 hours, concentrated to dryness and the residue suspended in water. The product was made basic with potassium carbonate in excess, and the insoluble oil that separated was extracted with benzene. The benzene solution was separated, washed with water, dried over anhydrous sodium sulfate, filtered and concentrated to dryness. The residue, a yellow oil, was purified by distillation under reduced pressure yielding 2-amino-5-chlorophenyl cyclopentyl ketone boiling at 132–136° at 15 mm.

Analysis.—Calcd. for $C_{12}H_{14}NOCl$ (223.5): C, 64.4; H, 6.26; N, 6.26. Found: C, 64.64; H, 6.30; N, 6.08, 6.03.

Example 8

2 g. of 2-amino-5-chlorophenyl cyclopentyl ketone was dissolved in ether, 0.3 ml. of bromoacetyl bromide was added and the reaction mixture was agitated. After 5 minutes, the turbid solution was washed 2 times with 100 ml. of water. The above step was repeated 4 times using 0.2 ml. of bromoacetyl bromide. After the last addition of acid halide, the reaction mixture was washed several times with water until neutral. The ether solution was dried over sodium sulfate. Following the removal of the desiccant by filtration, the ether solution was concentrated under reduced pressure on a water bath. The intermediate 5-chloro-2-bromoacetamidophenyl cyclopentyl ketone was not isolated but the residue was dissolved in 150 ml. of methanol and 150 ml. of 20% ammonia in methanol was then added. The solution was thoroughly mixed and allowed to remain 18 hours at room temperature. The residue, obtained after the volatile portion of the reaction mixture had been removed under reduced pressure on a water bath, was extracted with boiling C.P. ether. Dry hydrogen chloride was bubbled into the ether solution. The precipitated 7-chloro-5-cyclopentyl - 3H - 1,4-benzodiazepin-2(1H)-one hydrochloride was collected on a Buchner funnel was suspended in water, and excess sodium bicarbonate added with agitation. The solid base was filtered off, air dried and upon recrystallization from methanol and water melted at 170–171°.

Analysis.—Calcd. for $C_{14}H_{15}ClN_2O$: C, 64.0; H, 5.72. Found: C, 64.08; H, 6.14.

Example 9

1.3 g. of 7-chloro-5-cyclohexyl-3H-1,4-benzodiazepin-2 (1H)-one was dissolved in 50 ml. of dimethylformamide. The solution was cooled to 0° with an ice bath. 0.2 g. of sodium methoxide was added. The mixture was stirred for 1 hour, during which time the temperature was held below 3°. 0.5 g. of methyl iodide dissolved in 10 ml. of dimethylformamide was added dropwise with stirring. During the addition the temperature was held below 4° by means of an ice bath. Over the course of 3 hours, as the ice bath melted, the stirring reaction mixture was allowed to come to room temperature (23°). The reaction mixture was stirred an additional hour at room temperature and then concentrated at reduced pressure to dryness. The residue was partitioned between ether and water. The water portion was discarded. The ether portion was washed 2 times with water and then dried over sodium sulfate. Following the removal of the desiccant by filtration, the ether solution was concentrated under reduced pressure on a water bath. The residue was crystallized from ethyl acetate yielding 7-chloro-5-cyclohexyl-1-methyl-3H-1,4-benzodiazepin-2(1H)-one melting at 149–150° (uncorr.).

Analysis.—Calcd. for $C_{16}H_{19}N_2OCl$: C, 66.1; H, 6.55. Found: C, 65.83; N, 6.50.

Example 10

A solution of 16.8 g. of 2-methyl-6-chloro - 4H - 3,1-benzoxazin-4-one in 250 cc. of benzene was prepared with slight warming in a 3-neck round bottom flask. The solution was then cooled to room temperature. In another 3-neck round bottom flask—under Grignard conditions—cycloheptylmagnesium bromide was prepared from 2.7 g. magnesium turnings, 24.0 g. of cycloheptyl bromide in 70 cc. of ether. After 4 hours of refluxing, the formation of the Grignard complex was complete. The cycloheptylmagnesium bromide solution was added slowly to the benzoxazinone solution at room temperature with constant stirring. The reaction mixture was then heated to reflux temperature, refluxed for 1 hour, cooled to room temperature and decomposed with 30 cc. 6 N hydrochloric acid and ice.

An insoluble white precipitate was filtered off and the mother liquor was concentrated to dryness. The residue was dissolved in 160 cc. of ethanol, 26 cc. of concentrated hydrochloric acid added, and the resultant solution refluxed for 5 hours. The solution was then concentrated to dryness, water added, and the suspension made basic with solid potassium carbonate. The oil that separated was dissolved in benzene, washed several times with water, and the benzene solution dried over anhydrous sodium sulfate. The drying agent was removed by filtration and the benzene solution was concentrated to dryness to leave a thin syrup. This was distilled in vacuum to yield a liquid product boiling at 132–140°/0.08 mm. Upon treatment with pentane yellow crystalline 2-amino-5-chlorophenyl cycloheptyl ketone was obtained melting at 80–82°.

Example 11

0.7 g. of 2-amino-5-chlorophenyl cycloheptyl ketone was dissolved in 300 ml. of ether. 0.2 ml. of bromoacetylbromide was carefully added and the reaction mixture was agitated. After 5 minutes, the clear solution was washed twice with 100 ml. of water. The above step was repeated 4 times using 0.1 ml. of bromoacetylbromide. After the last addition of acid halide, the reaction mixture was washed several times with water until neutral. The ether solution was dried over anhydrous sodium sulfate. Following the removal of the desiccant by filtration, the ether solution was concentrated on a water bath. The intermediate 2-bromoacetamino-5-chlorophenyl cycloheptyl ketone was not isolated but the residue was dissolved in 100 ml. of methanol and 100 ml. of 20% ammonia in methanol then added thereto. The solution was thoroughly mixed and allowed to remain 18 hours at room temperature. The residue, obtained after the volatile portion of the reaction mixture had been removed under reduced pressure on a water bath, was extracted with boiling ether. Hydrogen chloride was bubbled into the solution and the hydrochloride salt of 7-chloro-5-cycloheptyl-3H-1,4-benzodiazepin-2(1H)-one that separated was collected and then dissolved in 300 ml. of water. Excess potassium carbonate was added to the aqueous solution, the base was collected on a Buchner funnel, and crystallized from methanol and water yielding 7-chloro-5-cycloheptyl-3H-1,4-benzodiazepin-2(1H)-one melting at 159–161° (uncorr.).

Analysis.—Calcd. for $C_{16}H_{19}N_2OCl$ (290.5): C, 66.10; H, 6.54. Found: C, 66.25; H, 6.62.

Example 12

A mixture of 1 g. of 2-amino-5-chlorophenyl cyclohexyl ketone, 1 g. of hydroxylamine hydrochloride, 5 ml. of ethanol, and 5 ml. of pyridine was refluxed on a steam bath for 2.5 hours. After the volatile components had been removed under vacuum on a water bath, the residue was triturated with 20 ml. of water and filtered. The filter cake was washed with water and then dried for several hours yielding 2-amino-5-chlorophenyl cyclohexyl ketoxime melting at 192–194° (uncorr.). This oxime is a mixture of the syn. and anti isomers.

Example 13

A mixture of 1 g. of syn. and anti 2-amino-5-chlorophenyl cyclohexyl ketoxime and 10 ml. of glacial acetic acid was heated with occasional swirling on a steam bath. When the temperature reached 50°, 0.6 ml. of chloroacetylchloride was added rapidly. The reaction was mixed thoroughly and allowed to remain at room temperature overnight. After the volatile components had been removed under reduced pressure on a water bath, the residue was dissolved in 20 ml. of acetone, allowed to stand at room temperature for several hours, and filtered. The filtrate was concentrated under vacuum and the residue was partitioned between 500 ml. of ether and 200 ml. of water. After the aqueous portion had been discarded, the ether layer was washed with dilute potassium carbonate and then water. The ether solution was then dried with sodium sulfate. After the desiccant had been removed by filtration, the filtrate was concentrated and the residue was crystallized from a small amount of acetone yielding 6-chloro-2-chloromethyl-4-cyclohexylquinazoline-3-oxide melting at 125–127° (uncorr.).

Example 14

600 mg. of 6-chloro-2-chloromethyl-4-cyclohexylquinazoline 3-oxide was added with stirring to 30 ml. of cold (+3°) 25% monomethylamine in methanol. The solution was stirred 0.5 hour at ice bath temperature and allowed to come to room temperature slowly, with stirring. A trace of crystals that appeared after the reaction was kept overnight in the refrigerator was removed by filtration, and the filtrate was concentrated to dryness at reduced pressure. The residue was partitioned between 200 ml. of ether and 100 ml. of water. The ether layer was separated and washed three times with 40 ml. of water. Filtration was used to remove the desiccant after the ether solution had dried over sodium sulfate and the filtrate was concentrated under reduced pressure. The residue was crystallized twice from methanol yielding 7-chloro-2-methylamino-5-cyclohexyl - 3H-1,4-benzodiazepine 4-oxide melting at 230–231° (uncorr.).

We claim:
1. A compound of the formula:

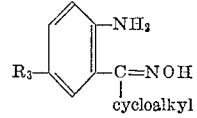

wherein $R_3$ is selected from the group consisting of hydrogen, halogen and nitro and said cycloalkyl group contains from 5 to 7 carbon atoms.

2. The compound of claim 1 which is 2-amino-5-chlorophenyl cyclohexyl ketoxime.

References Cited

UNITED STATES PATENTS 2,893,992   7/1959   Sternbach _____ 260—570 XR
3,267,110   8/1966   Pachter et al. ____ 260—570 XR CHARLES B. PARKER, Primary Examiner.
ROBERT V. HINES, Examiner.